(12) United States Patent
Hertzfeld

(10) Patent No.: US 6,441,824 B2
(45) Date of Patent: Aug. 27, 2002

(54) METHOD AND APPARATUS FOR DYNAMIC TEXT RESIZING

(75) Inventor: Andy Hertzfeld, Palo Alto, CA (US)

(73) Assignee: Datarover Mobile Systems, Inc., Sunnyvale, CA (US)

(*) Notice: Subject to any disclaimer, the term of this patent is extended or adjusted under 35 U.S.C. 154(b) by 0 days.

(21) Appl. No.: 09/237,285

(22) Filed: Jan. 25, 1999

(51) Int. Cl.[7] .................................... G09G 5/26
(52) U.S. Cl. .............................. 345/472; 345/685
(58) Field of Search ........................... 345/132, 141, 345/3, 471, 472, 472.1, 698, 815, 169, 472.2, 685, 780; 707/517, 523

(56) References Cited

U.S. PATENT DOCUMENTS

| | | | | |
|---|---|---|---|---|
| 5,815,160 A | * | 9/1998 | Kikuchi et al. | 345/439 |
| 5,864,332 A | * | 1/1999 | Young | 345/127 |
| 5,936,545 A | * | 8/1999 | Tsumura | 340/825.44 |
| 6,069,637 A | * | 5/2000 | Gaglione et al. | 345/435 |
| 6,107,986 A | * | 8/2000 | Kennard et al. | 345/141 |
| 6,121,978 A | * | 9/2000 | Miler | 345/435 |
| 6,256,650 B1 | * | 7/2001 | Cedar et al. | 707/517 |
| 6,292,176 B1 | * | 9/2001 | Reber et al. | 345/169 |
| 6,297,795 B1 | * | 10/2001 | Kato et al. | 345/123 |

* cited by examiner

Primary Examiner—Jeffery Brier
(74) Attorney, Agent, or Firm—Philip W. Woo; Skjerven Morrill LLP

(57) ABSTRACT

A method and apparatus for determining a format for displaying information in a display area coupled to a computer system, the format being based on the size of the display area and the amount of information to display. As a user continues to enter information in the display area, software program instructions update the format of the information when the amount of information to display changes. This includes reducing the size of the font as additional information is entered and enlarging the size of the font when enough information is deleted to create available space. The font type and/or the font size may be changed to allow the information to fit within the available display area. The size of the text may be reduced to a minimum level and, and as more information is entered, the display is scrolled so the user may view the most recently entered data. A scale also be determined to reduce or enlarge graphics information so that it fits within the available display area.

29 Claims, 4 Drawing Sheets

402 — | Some Names Are |

*FIG. 4a*

| Some Names Are Very |

*FIG. 4b*

| Some Names Are Very Long |

*FIG. 4c*

| Some Names Are Very Long Indeed. That |

*FIG. 4d*

| es are very long indeed. That is why we d |

*FIG. 4e*

METHOD AND APPARATUS FOR DYNAMIC TEXT RESIZING

BACKGROUND OF THE INVENTION

1. Field of the Invention

This invention relates to the field of graphical user interfaces, and more particularly, to the display of information in data entry fields on a display device as the information is being entered by a user.

2. Description of the Related Art

Increasingly, computerized devices include graphical user interfaces that allow a user to enter data and select options from a display device. Frequently, a user enters data in a text field having a fixed size. Depending on the size and style of the text, the user may fill up the text field before all the information is entered.

In the prior art, some systems do not allow data entry past the number of characters that fit in the text field. Other systems allow a user to keep entering data, but do not update the display. When a buffer is filled with a predetermined number of characters, an audio or visual indication, such as a beep, may be given to indicate that no more data will be accepted. Another solution to the problem of text fields that do not accommodate all the text the user wishes to enter is provided by scrolling the text sideways or off the top of the field so that the user may view the text currently being entered. The user may view scrolled portions of the text using vertical or horizontal sliding bars.

Currently, highly portable computer systems and personal communication systems are gaining popularity. To increase consumer satisfaction, manufacturers strive to include as many capabilities as possible, while making the devices as lightweight and compact as possible. The size and weight constraints limit the amount of space available for the display device. It is therefore desirable to provide a display device that allows the user to view as much information as possible while retaining legibility of the information.

SUMMARY

In one embodiment, the present invention provides a method that may be implemented in computer program instructions and distributed on a computer readable medium as a computer program product. The program instructions determine a format for displaying information in a display area coupled to the computer system, the format being based on the size of the display area and the amount of information to display. As a user continues to enter information in the display area, the program instructions update the format of the information when the amount of information to display changes. This includes reducing the size of the font as additional information is entered and enlarging the size of the font when enough information is deleted to increase the size of the font.

An additional feature of the present invention is that it will determine whether changing the font type instead of or in addition to changing the font size will allow the information to fit within the available display area.

Another feature of the present invention is that it will reduce the size of the text to a minimum level. When the user continues to enter information with the text at its minimum size, the present invention will scroll the information off the display area so the user may view the most recently entered data.

An additional feature of the present invention is that it will determine a scale for graphical information. This allows both text and graphic information to be reduced and enlarged to fit within the available display area.

The foregoing has outlined rather broadly the objects, features, and technical advantages of the present invention so that the detailed description of the invention that follows may be better understood.

BRIEF DESCRIPTION OF THE DRAWINGS

The present invention may be better understood, and its numerous objects, features, and advantages made apparent to those skilled in the art by referencing the accompanying drawings.

FIGS. 4A–4E are examples of a data entry field with information being entered that illustrate how the size and style of text may be altered in accordance with the present invention to fit in the space available.

The use of the same reference symbols in different drawings indicates similar or identical items.

DETAILED DESCRIPTION

The following sets forth a detailed description of the best contemplated mode for carrying out the invention. The description is intended to be illustrative of the invention and should not be taken to be limiting.

Figure 1:
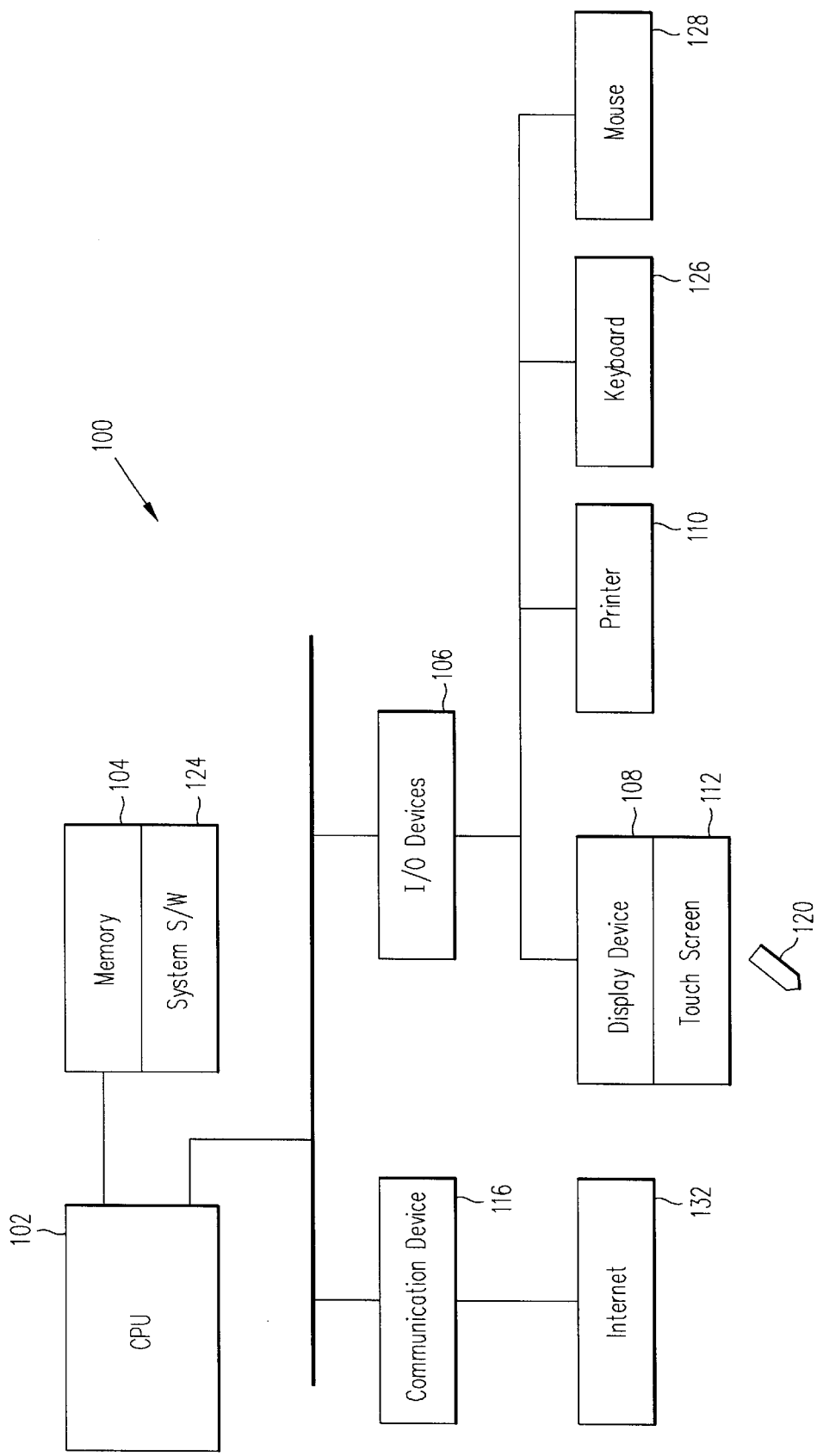
FIG. 1 is a block diagram of components included in a computer system.

Referring now to FIG. 1, a diagram of components commonly included in computer system 100 within which the present invention may be utilized is shown. Computer system 100 includes central processing unit (CPU) 102 which is coupled to memory 104, input/output (I/O) devices 106 such as display device 108, printer 110, and touch screen 112, and communication device 116. Memory 104 includes random access memory. Memory 104 also includes non-volatile memory such as read only memory or magnetic discs. CPU 102 can be constructed from one or more microprocessors and/or integrated circuits.

Display device 108 is, for example, a liquid crystal display (LCD) having 480 columns by 220 rows of pixels, each pixel being capable of displaying one of four levels of gray. Display device 108 may incorporate touch screen 112 which is a touch sensitive device that overlays display device 108 and provides signals to CPU 100 when it is touched by a touching device such as stylus 120 or by the finger of a user. The signals include signals indicating the coordinate location of display device 108 where the touch occurred.

While touch screen 112 is described herein as the position locator used with the present invention, any known position locator can be used with the present invention. Other position locators which can be used with the present invention include mouse devices, trackball devices, thumbwheels, tablets, scanline sensitive stili, joysticks and radio-frequency digitizing devices. The term position locator refers to any device which can be used to indicate a position on the display screen.

Often the position indicated by a position locator corresponds to the location of a cursor which is displayed on the display device 108. However, with touch screen 112, the position corresponds to the location that is touched. Most position locators are operable in an actuated state and in a deactuated state. For example, mouse devices often include a mouse button, the pressing of which places the mouse device in an actuated state and the releasing of which places the mouse device in a deactuated state. Touch screen 112 is in an actuated state while touched and in a deactuated state while not touched.

Actuating a position locator, i.e., placing the position locator in an actuated state, while the position locator indicates the position at which an object is displayed in display device 108 is herein called touching the object. An object may be a word, a group of words, or a graphic image. The touching of an object, which can be effected with any known position locating device, should not be confused with the physical touching of touch screen 112 which actuates touch screen 112 and indicates a point on display device 103. For example, an object can be touched using a mouse device as a position locator by manipulating the mouse to indicate a position within display device 108 occupied by the object and actuating the mouse device. Further, the term touching text is also referred to herein as selecting text.

Memory 104 stores Magic Cap™ system software 124 which controls the operation of computer system 100. System software 124 includes groups of instructions which are organized as modules. During operation of system 100, CPU 102 retrieves the modules from memory 104 and executes the modules to perform tasks. Computer system software 124 includes modules which provide a graphical user interface to display device 108.

Those skilled in the art will recognize that computer system 100 encompasses all types of computer systems including personal computers, midrange computers, mainframes, and handheld personal communication systems. Note that many additions, modifications, and deletions can be made to this computer system 100 when used with the present invention. Computer system 100 may be one of many computer systems connected to a local area network (LAN), a wide area network (WAN), or a global information network such as the Internet 132.

While the present invention is described in the context of a fully functional computer system, those skilled in the art will appreciate that the present invention is capable of being distributed as a program product in a variety of forms, and that the present invention applies equally regardless of the particular type of signal bearing media used to actually carry out the distribution. Examples of signal bearing media include: recordable type media such as floppy disks and CD-ROM, transmission type media such as digital and analog communications links, as well as other known media storage and distribution systems.

Figure 2A:
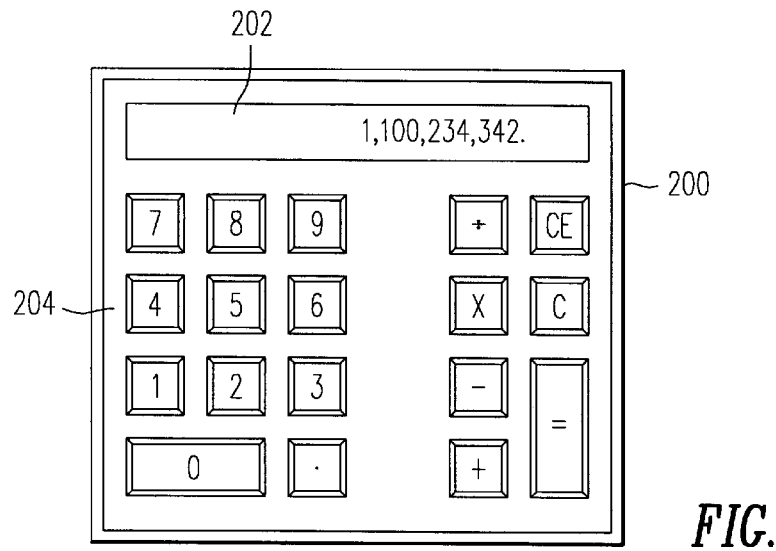
FIGS. 2*a*–2*c* are examples of a graphical display of a calculator having a data entry field for user input.
Figure 2B:
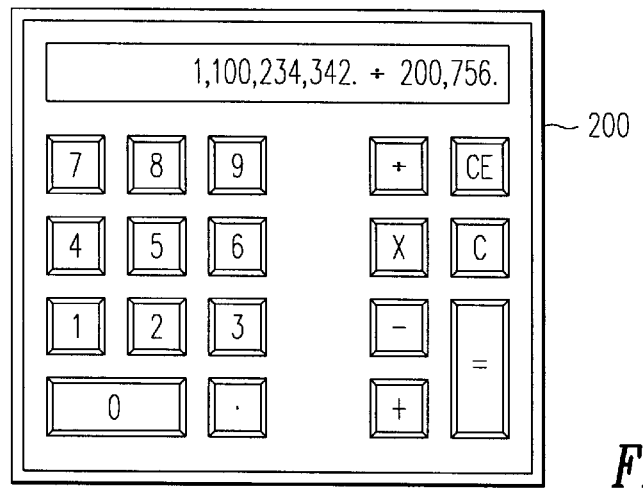
Figure 2C:
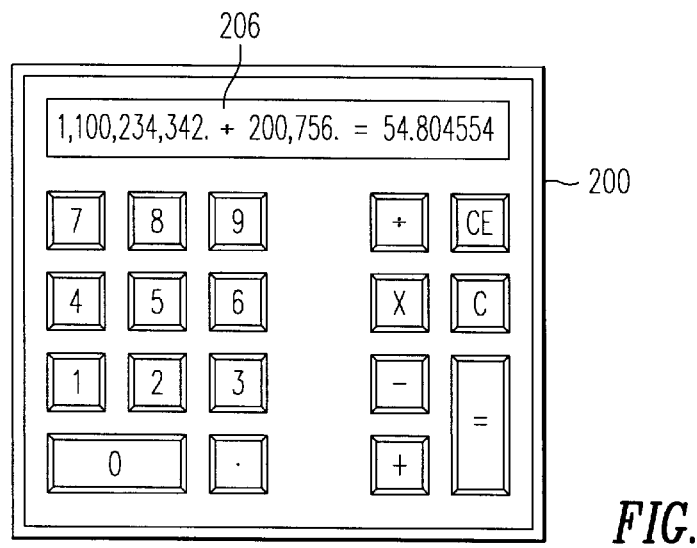

In one embodiment, the present invention is a method for determining a format for displaying information in a data entry field, where the data entry field is displayed on display device 108 coupled to computer system 100. FIGS. 2a–2c show a graphical representation of calculator 200 that may be displayed on display device 108. A user typically inputs information using a data input device such as keypad 204. Keypad 204 may be implemented with touch screen 112 so a user may touch number and function keys directly on display device 108. Keypad 204 may also be implemented so that a user may point and click on number and function keys using mouse 128, a light pen, or other suitable input devices. As the user enters numbers and functions, the characters are displayed in a limited area of display device 108, such as data entry field 202. With the present invention, characters are initially displayed in a format having the largest size characters that are legible in data entry field 202. When the user continues to enter characters and fills data entry field 202, the size of the characters is reduced as shown in FIG. 2b so that all the data entered is visible in data entry field 202. In the example shown in FIG. 2c, the user has entered the equals sign and the size of the characters in data entry field 202 is further reduced so that the result of the arithmetic operation may be displayed along with the equation.

Figure 3:
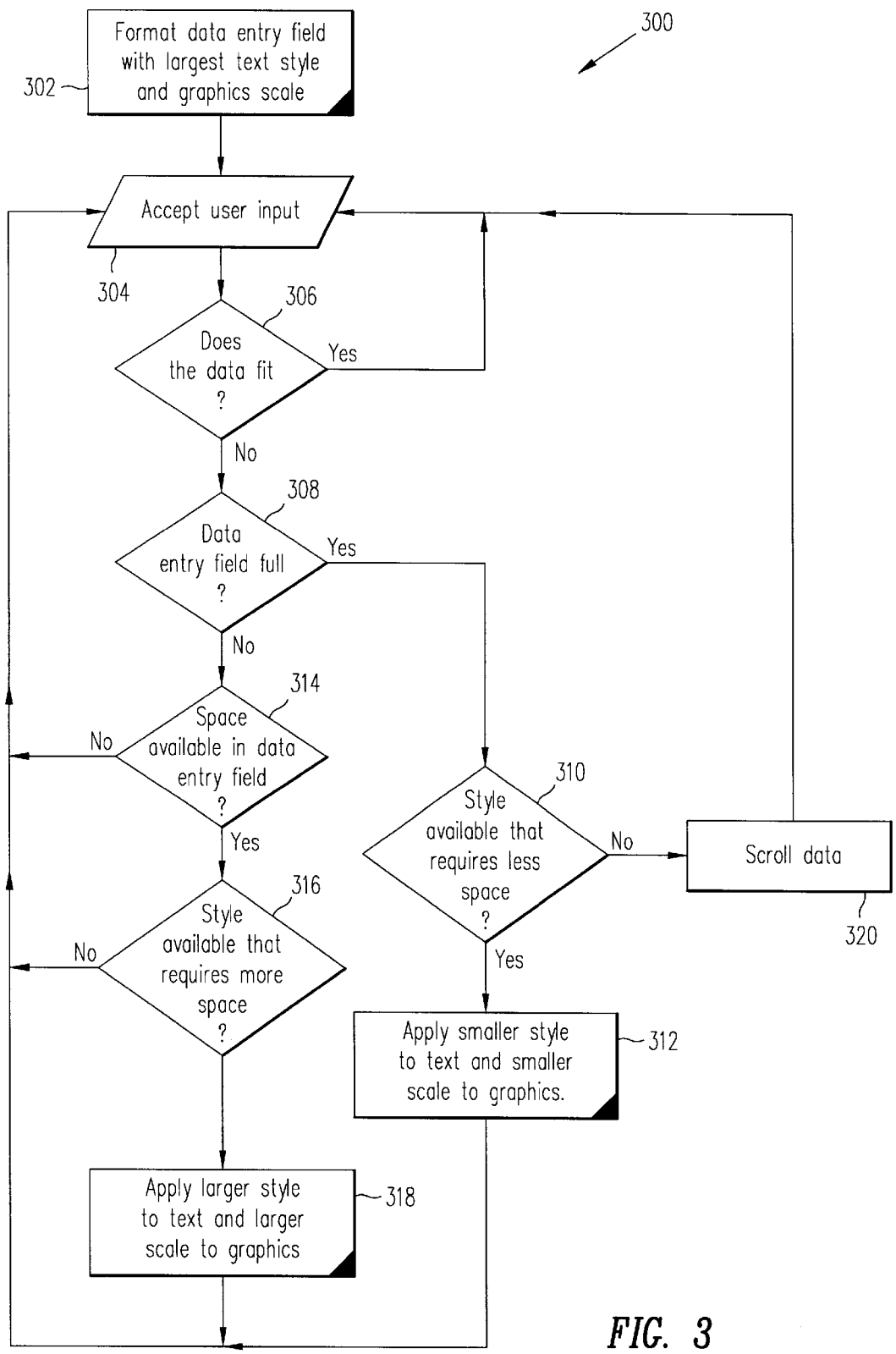
FIG. 3 is a flowchart of a method for altering the display of information in a data entry field in accordance with the present invention.

The present invention thus includes determining whether the information entered by the user fits within the data entry field as shown in flowchart 300 in FIG. 3. In block 302, the present invention formats the information in the data entry field with the largest font format that allows the information to be displayed in the data entry field. As user input is accepted in block 304, the present invention determines whether the information fits within the data entry field in block 306. When the data entry field is full (block 308), the present invention determines if a smaller font format is available (block 310) to apply to the information so that it will fit in the data entry field. A minimum size may be specified so that the information is not reduced to the point where the user cannot read it. When a smaller format is available, it is applied to the text (block 312). A scale may optionally be applied to reduce graphical information. Similarly, the present invention will enlarge information in the data entry field if the user deletes information that was previously entered, thereby creating available space in the data entry field (blocks 314–318). Additionally, the present invention may include user-selectable options (not shown) such as allowing the user to enable or disable dynamic text resizing, to enable or disable scrolling, to specify the minimum size, and whether to change text attributes such as capitalization or style.

FIGS. 4a–4e show an example of textual information being entered in data entry field 402. Note the gradual reduction of the size of the text between the figures as the amount of information entered increases. Note also that the text is bold in FIG. 4a, but not in FIG. 4b. Further, the initial letters are capitalized in FIGS. 4a–4d, but are changed to smaller case in FIG. 4e so that only the beginning of a sentence begins with a capital letter. Thus, in determining the font format, the present invention may vary font size, font style, or both font size and style to find a combination that allows the information to fit within the display area available. Font style includes attributes such as bold, italics, case (e.g., lower, capital, small capital, initial letter capital), and font type (e.g., courier, times new roman, gothic, and other known font types).

The present invention further includes a scrolling feature that is utilized when the user continues entering information, and the text style reaches a minimum size as shown in block 320 in FIG. 3. FIG. 4e shows an example of text scrolling off the data entry field 402 in the direction opposite the point of data entry. In the present invention, when information is entered from left to right, the information scrolls to the left. When information is entered from right to left, as in some foreign languages, the information scrolls to the right. When data entry field 402 is large enough to accommodate multiple lines of information, then the information may scroll off the top or bottom of the display, depending on the direction information is entered, so that the most recently entered information is displayed.

In addition to character or textual data, graphics data may also be displayed in a data entry field, depending on the specific application being utilized in system software 124.

The present invention determines a scale to apply to the graphics data so that it may be reduced or enlarged to fit in the data entry field.

While the invention has been described with respect to the embodiments and variations set forth above, these embodiments and variations are illustrative and the invention is not to be considered limited in scope to these embodiments and variations. It is anticipated that the present invention may be utilized in many different types of electronic systems that include data entry fields on a display. This includes systems ranging from computer systems with relatively large display devices, to devices with smaller display areas such as personal communicators, calculators, telephones, televisions, and microwave ovens. Accordingly, various other embodiments and modifications and improvements not described herein may be within the spirit and scope of the present invention, as defined by the following claims.

What is claimed is:

1. A computer system comprising:
    a display device having a limited display area for displaying information;
    a user input device operable to allow a user to input at least a portion of the information; and
    a memory having a set of program instructions stored therein, the program instructions being operable to dynamically update the displayed information when the user inputs the portion of the information, wherein dynamically updating the displayed information includes determining the largest format that can be used for displaying the information based on the size of the display area and the amount of information to be displayed, and determining the format for displaying information includes determining a text font type.

2. The computer system, as set forth in claim 1, wherein the program instructions are further operable to display text in the largest font which allows all of the information to be displayed in the display area.

3. The computer system, as set forth in claim 1, wherein the program instructions are further operable to limit the format for displaying the information to a minimum size and to scroll the information when the program instructions determine that the format for displaying the information is smaller than the minimum size.

4. The computer system, as set forth in claim 1, wherein the program instructions are further operable to determine a scale for including all of the information in the display area, and to apply the scale to display graphical information.

5. The computer system, as set forth in claim 1, wherein determining the format for displaying information includes determining a text font size.

6. A computer program product comprising:
    a computer readable medium storing program instructions, the program instructions being operable to determine a format for displaying information in a display area, wherein the information can include characters, the format being based on the size of the display area and the number of characters to display, the program instructions being further operable to determine whether to update the format when the number of characters to display changes and determining the format for displaying information includes determining a text font type.

7. The computer program product, as set forth in claim 6, wherein the program instructions are further operable to display text in the largest font which allows all of the text to be displayed in the display area.

8. The computer program product, as set forth in claim 6, wherein the program instructions are further limit the format for displaying the information to a minimum size and to scroll the information when the program instructions determine that the format for displaying the information is smaller than the minimum size.

9. The computer program product, as set forth in claim 6, wherein the program instructions are further operable to determine a scale for including all of the information in the display area, and to apply the scale to display graphical information.

10. The computer program product, as set forth in claim 6, wherein determining the format for displaying information includes determining a text font size.

11. A method for determining a format for displaying information in a display area wherein a data entry field is displayed, the method comprising:
    formatting the data entry field with the largest text style;
    accepting information input by a user;
    determining whether the information fits within the data entry field; and
    formatting the information in the data entry field with the largest text style that allows the information input by the user to be displayed in the data entry field when the amount of information does not fit within the data entry field using a larger text style, wherein formatting the data entry field with the largest text style includes determining a text font type.

12. The method, as set forth in claim 11, further comprising limiting the text style to a minimum size.

13. The method, as set forth in claim 12, further comprising scrolling the information when the text style reaches a minimum size.

14. The method, as set forth in claim 11, wherein the information in the data entry field includes graphical information, the method further comprising:
    determining a scale for including all of the information in the display area; and
    applying the scale to display the graphical information.

15. A signal in a carrier medium comprising:
    computer instructions to implement the method of claim 11.

16. The method, as set forth in claim 11, wherein formatting the data entry field with the largest text style includes determining a text font size.

17. An apparatus comprising:
    means for displaying information;
    means for inputting information, wherein the information can include characters;
    means for determining a format for displaying the information based on the size of the display area and the number of characters to display, and
    means for determining whether to update the format when the number of characters to display changes, wherein the means for determining the format for displaying information includes determining a text font type.

18. The apparatus, as set forth in claim 17, further comprising means to display text in the largest font which allows all of the information to be displayed in the display area.

19. The apparatus, as set forth in claim 17, further comprising means to limit the format for displaying the information to a minimum size and to scroll the information when the format for displaying the information is smaller than the minimum size.

20. The apparatus, as set forth in claim 17, further comprising means to determine a scale for including all of the information in the display area, and to apply the scale to display graphical information.

21. The apparatus, as set forth in claim 17, wherein the means for determining the format for displaying in-formation includes determining a text font size.

22. A method for determining a format for displaying information in a display area wherein a data entry field is displayed, the method comprising:

formatting the data entry field with the largest text style;

accepting information input by a user;

determining whether the information fits within the data entry field; and formatting the information in the data entry field with the largest text style that allows the information input by the user to be displayed in the data entry field when the amount of information does not fit within the data entry field using a larger text style; and scrolling the information when the text style reaches a minimum size.

23. The method, as set forth in claim 22, wherein formatting the data entry field with the largest text style includes determining a text font type.

24. The method, as set forth in claim 22 wherein the information in the data entry field includes graphical information, the method further comprising:

determining a scale for including all of the information in the display area; and applying the scale to display the graphical information.

25. A signal in a carrier medium comprising:

computer instructions to implement the method of claim 22.

26. An apparatus comprising:

means for displaying information;

means for inputting information, wherein the information can include characters;

means for determining a format for displaying the information based on the size of the display area and the number of characters to display;

means for determining whether to update the format when the number of characters to display changes;

means to limit the format for displaying the information to a minimum size; and means to scroll the information when the format for displaying the information is smaller than the minimum size.

27. The apparatus, as set forth in claim 26, further comprising means to display text in the largest font which allows all of the information to be displayed in the display area.

28. The apparatus, as set forth in claim 26, wherein the means for determining a format for displaying the information includes determining a text font type.

29. The apparatus, as set forth in claim 26, further comprising means to determine a scale for including all of the information in the display area, and to apply the scale to display graphical information.

* * * * *